(No Model.)
W. M. RAPE & J. D. MEADOWS.
WAGON BRAKE.
No. 582,089. Patented May 4, 1897.
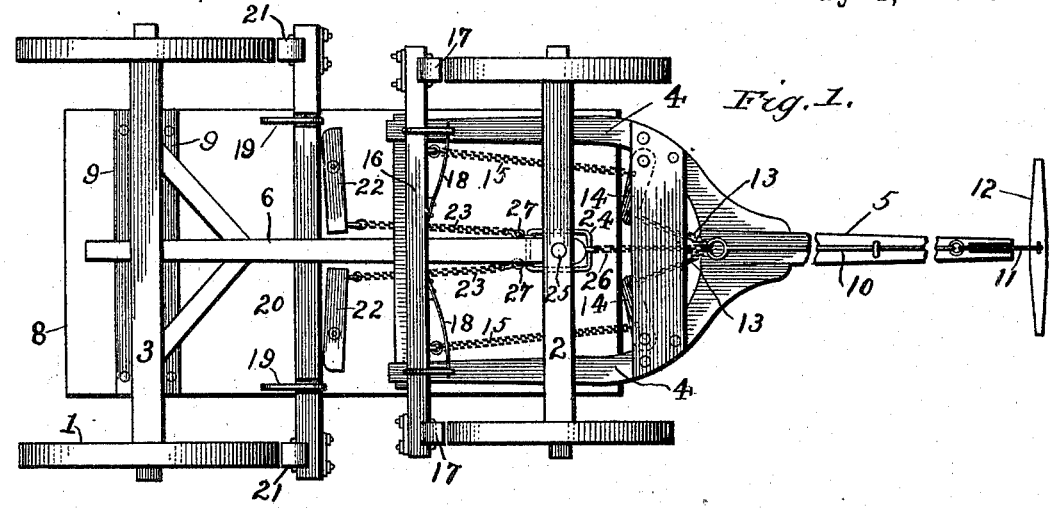
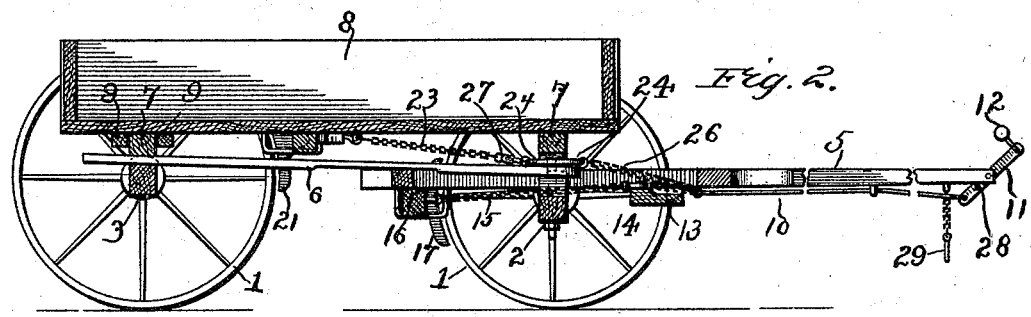
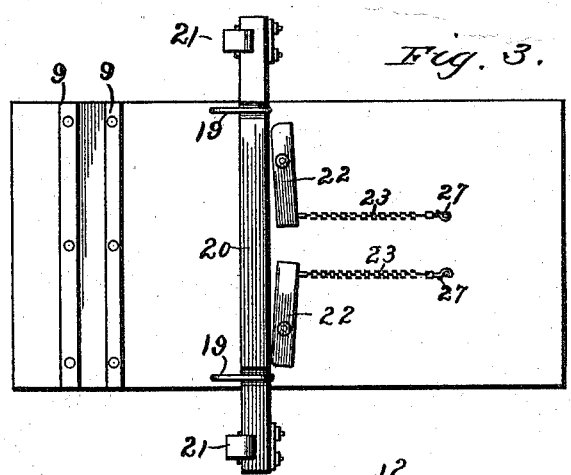
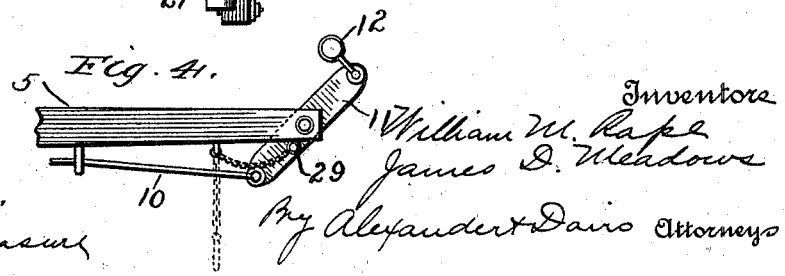
Witnesses
G. H. Walmsley
Geo. M. Lamasure
Inventors
William M. Rape
James D. Meadows
By Alexander & Davis Attorneys

UNITED STATES PATENT OFFICE.

WILLIAM M. RAPE, OF NOTASULGA, AND JAMES D. MEADOWS, OF WALNUT HILL, ALABAMA.

WAGON-BRAKE.

SPECIFICATION forming part of Letters Patent No. 582,089, dated May 4, 1897.

Application filed October 29, 1896. Serial No. 610,436. (No model.)

*To all whom it may concern:*

Be it known that we, WILLIAM M. RAPE, residing at Notasulga, county of Macon, and JAMES D. MEADOWS, residing at Walnut Hill, in the county of Tallapoosa, State of Alabama, citizens of the United States, have invented certain new and useful Improvements in Wagon-Brakes, of which the following is a specification, reference being had therein to the accompanying drawings.

This invention relates to a new and useful improvement in automatic wagon-brakes; and it has for its object to provide such a brake of simple construction which will be operated to apply the brakes on the wheels of the vehicle as the horses hold back when going downhill and which will release the brakes when the horses draw the vehicle.

The invention consists in the novel combination and arrangement of parts hereinafter described, and particularly pointed out in the claims appended.

In the drawings, Figure 1 is a bottom view of a wagon, showing the brake in position.
Fig. 2 is a longitudinal vertical sectional view thereof. Fig. 3 is a bottom view of the wagon-body removed from the bolsters, and Fig. 4 is a detail view of the end of the tongue.

Referring to the various parts by numerals, 1 designates the wheels; 2, the front axle, and 3 the rear axle; 4, the hounds carried by the front axle, and 5 the tongue carried by the hounds. The axles are connected by a reach 6 in any suitable manner. Bolsters 7 7 are secured to the axles and receive a removable wagon-body 8, cleats 9 9 being secured to the under side of said body near its rear end to receive the rear bolster between them and prevent any endwise movement of the wagon-body.

To the under side of the tongue in suitable supports or keepers is mounted a longitudinal operating-rod 10, to whose forward end is secured the lower end of a lever 11, which is pivoted in the end of the tongue. To the upper end of this lever above the tongue is secured the neck-yoke 12. The rear end of this rod 10 is connected by chains 13 13 to the inner ends of horizontal levers 14 14, which are pivoted upon a cross-bar carried by the hounds, one of said levers being pivoted at each side of the vehicle. To each of these levers, between its pivot and the connection to chain 13, is fastened one end of a chain 15, whose other end is connected to the brake-beam 16, mounted on the hounds and carrying brake-shoes 17, which are adapted to engage the rear side of the front wheels. Springs 18 18 normally hold the brakes 17 off the wheels.

Mounted to slide in keepers 19, secured to the wagon-body, is a brake-beam 20, whose shoes 21 are adapted to engage the forward side of the rear wheels. Pivoted to the wagon-body just forward of the beam 20 are two horizontal levers 22, whose outer ends are adapted to engage the brake-beam 20 and force it rearwardly, their inner ends being each detachably connected by a chain 23 and snap-hook 27 to the rear end of a yoke 24, which extends around the king-bolt 25. The forward end of this yoke is connected by a chain 26 to the rear end of the operating-rod 10.

The operation is as follows: When going downhill, the horses will hold back on the neck-yoke 12 and thereby draw forward the rod 10 and apply the brakes on all the wheels, as will be readily understood. By means of the yoke 24 the chains leading to the rear brake-beam will be held in proper operative position and will be prevented from getting caught between the front axle and bolster when the vehicle is turning. It also permits of the use of only one chain from the yoke to the rod 10 to operate both levers 22, and holds said chain in proper position when the rear brakes are removed. When it is desired to use the vehicle without the body 8, the snap-hooks 27 are disconnected from the yoke 24, and the said body 8 may then be removed. The forward brake will remain in proper operative position as it is carried by the hounds.

It will be readily understood that with our construction a very light rearward pull on the lever 11 will apply the brakes with great force. It will also be seen that the strain of "braking" the vehicle will be distributed over the entire running-gear and the wrenching and twisting of the forward part of said gear greatly lessened.

To prevent the horses from applying the brakes when backing the vehicle, a hole 28 is formed in the lever 11, just under the tongue, in which is inserted a pin 29. This pin will bear against the under side of the tongue and permit only a very slight rearward movement of the lever. As is manifest, the pin must be removed when it is desired to apply the brakes.

Having thus fully described our invention, what we claim, and desire to secure by Letters Patent, is—

1. In a wagon-brake the combination of a running-gear comprising axles, supporting-wheels, hounds carried by the front axle, a tongue, a rod 10, lever 11 pivoted in the end of the tongue and connected to rod 10, neck-yoke 12, inwardly-extending levers 14, 14 carried by the hounds, chains 13, 13, connected to the rear end of rod 10 and to the inner ends of levers 14, 14, a brake-beam 16 slidably mounted upon the hounds, chains 15, 15, connected to levers 14, 14, between their pivots and their inner ends, spring 18 for normally holding brake-beam 16 rearwardly, a movable wagon-body carried by the axles, a brake-beam 20 mounted upon the wagon-body, a yoke 24 extending around the king-bolt, levers 22, 22, carried by the wagon-body, their outer ends being adapted to bear against the brake-beam 20, chains 23 connected to the inner ends of said levers 22, the front ends of said chains being detachably connected to the rear end of yoke 24, and a chain connected to the front end of said yoke and to the rear end of rod 10 between the chains 13, whereby one set of brakes will be permanently carried by the hounds and one set will be removable with the wagon-body, substantially as described.

2. In a wagon-brake the combination of a running-gear comprising an axle, supporting-wheels, hounds carried by the axle, a tongue, rod 10, lever 11 pivoted in the end of said tongue and connected to rod 10, neck-yoke 12, inwardly-extending levers 14, 14 carried by the hounds, chains 13, 13 connected to the rear end of the rod 10 and to the inner ends of levers 14, 14, a brake-beam slidably mounted upon the hounds, chains 15, 15 connected to levers 14, 14 between their pivots and their inner ends, and spring 18 for normally holding the brakes off the wheels, substantially as described.

In testimony whereof we affix our signatures in presence of two witnesses.

WILLIAM M. RAPE.
JAMES D. MEADOWS.

Witnesses:
J. C. SPRATLEN,
M. C. HOLLEY.